May 12, 1959  F. B. PORGES  2,886,348
MECHANICAL SEALS
Filed Nov. 6, 1957

Inventor
F. B. Porges
By Glascock Downing Seebold
Attys.

United States Patent Office 2,886,348
Patented May 12, 1959

2,886,348

MECHANICAL SEALS

Frederick B. Porges, Carr Wood, Hale Barns, England, assignor to Flexibox Limited, Manchester, Lancashire, England, a British company Application November 6, 1957, Serial No. 694,839

Claims priority, application Great Britain November 9, 1956

3 Claims. (Cl. 286—8)

This invention relates to mechanical seals for revolving shafts and is concerned more particularly with such seals which are normally subjected to high temperatures, such as will be the case, for example, where the shaft is the impeller shaft of a centrifugal pump dealing with hot boiler feed water. The seals to which this invention relates are of the type in which the rotary seal ring is spring loaded and has associated therewith a resilient gasket disposed between the interior of the rotary seal ring and a part of or revolving with the shaft.

The object of the present invention is to provide simple and efficient means to cool the mechanical seal.

The invention consists in a mechanical seal, for a pump or like revolving shaft, of the type referred to in which a sleeve revolving with the shaft has one end of a compression coil spring bearing thereon, the other end of which bears upon the rotary seal ring which presses upon the fixed seal ring, there being a fixed sleeve around the revolving sleeve, the latter having a scroll groove in its periphery to propel cooling liquid entering the space between the two sleeves from a coolant inlet branch on a part attached to the pump or like casing via the exterior of the fixed and rotary seal rings, and deliver it into a revolving part having radial holes therein which deliver coolant to the outside of the fixed sleeve and so to the coolant outlet branch on a part attached to the pump or like casing.

Figure 1:
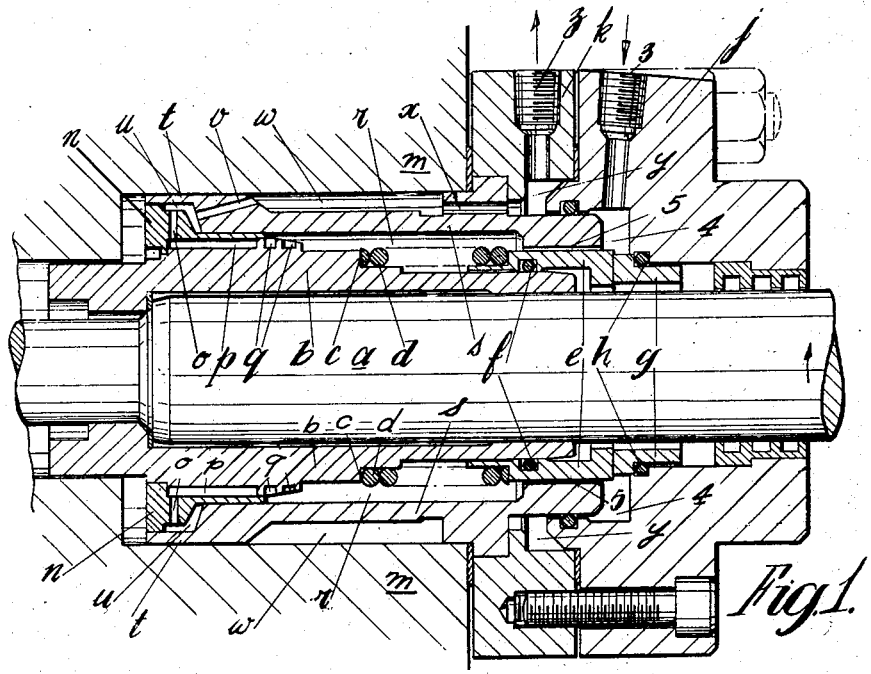
Figure 2:
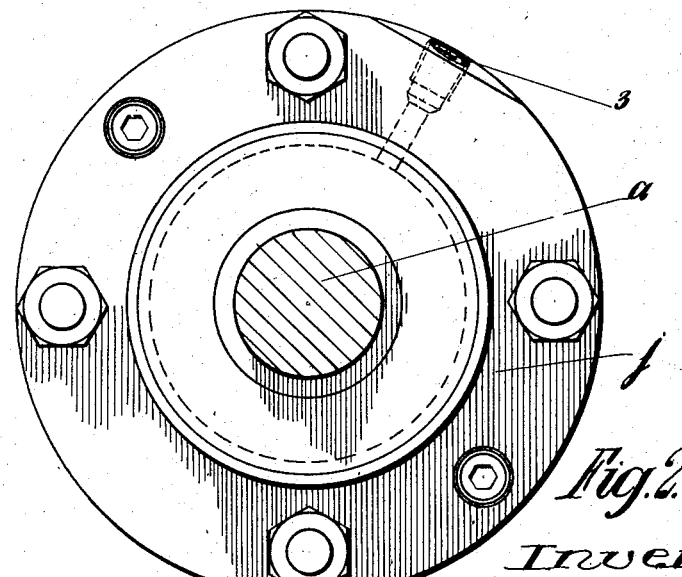

Referring to the accompanying explanatory drawings:

Figure 1 is a sectional elevation and Figure 2 an end view of a mechanical seal with cooling means arranged in one convenient form in accordance with this invention.

The shaft $a$, which may for example be a pump shaft, has keyed thereto a sleeve $b$ with a shoulder $c$ thereon against which bears one end of a compression coil spring $d$, the other end of which bears upon a shoulder on the rotary seal ring $e$ which has a packing ring $f$ therein bearing upon the exterior of the sleeve $b$. The rotary seal ring $e$ bears upon and makes a sealing joint with the fixed seal ring $g$ which presses upon a packing ring $h$ in the fixed part $j$ bolted to a member $k$ which is itself bolted to the pump or other housing $m$. If desired a number of small diameter compression coil springs may be interposed between the sleeve $b$ and the rotary seal ring $e$.

The sleeve $b$ has a further sleeve $n$ fastened thereto and this further sleeve has radial apertures $o$ therein and also slots or a cavity $p$ therein between itself and the sleeve $b$. At the entrance to the slots or cavity $p$, the sleeve $b$ has an external scroll slot $q$ therein which opens at one end into the space $r$ between the revolving sleeve $b$ and a fixed sleeve $s$ and at the other end into the space $p$. The sleeve $s$ which may be made of an erosion resisting metal has a part $t$ which extends over but at a distance from the outlet ends of the radial holes $o$ and provides an annular cavity $u$ between itself and the sleeve $n$. Apertures $v$ through the fixed sleeve $s$ connect the cavity $u$ with the space $w$ around the fixed sleeve $s$ and through the axial holes $x$ in the sleeve $s$ with a space $y$ leading to an outlet branch $z$ for the cooling medium. The fixed sleeve $s$ is secured in place between the member $k$ and the casing $m$.

There is a cooling medium inlet branch at 3 which leads to a space 4 and via an annular gap 5 to the space $r$ between the revolving sleeve $b$ and the fixed sleeve $s$.

With the arrangement described, the cooling medium is drawn from the branch 3, space 4, annular gap 5 and space $r$ to the scroll $q$ which delivers it via the space $p$ to the radial holes $o$ which in turn deliver it via the space $u$, apertures $v$, space $w$, holes $x$ and space $y$ to the outlet branch $z$. There is a cooler (not shown) arranged between the branches $z$ and 3.

The cooling liquid is continuously circulated from the cooler to the space around the fixed and rotary seal rings constituting the mechanical seal, and so to the impeller scroll $q$ and radial holes $o$ which deliver it back to the cooler clear of the parts of the mechanical seal which it is desired to keep cool.

The fixed sleeve $s$ before referred to which separates the incoming cooling liquid from the liquid returning to the cooler, serves also to protect the pump casing around the radial holes $o$ from erosion by impingement of the cooling liquid leaving such radial holes.

With the improvement the parts of the mechanical seal for the shaft $a$ and of the coolant circulating system are fitted into a pump housing without altering such housing. The external fluid connections are on the attached parts $j$ and $k$ and none are on the pump casing $m$ itself.

What I claim is:

1. A mechanical seal for making a fluid-tight joint between a rotatable shaft and a stationary part of a pump comprising, an inner sleeve keyed on said shaft, a fixed seal ring around the shaft, a rotary seal ring around said shaft, a coil spring engaging said sleeve and said rotary seal ring and pressing said rotary seal ring against the fixed seal ring, an outer sleeve fixed to a stationary part of the pump surrounding the inner sleeve, said inner sleeve having a scroll groove in its periphery, an inlet coolant branch attached to the stationary part of the pump to admit a coolant to the space between the inner and outer sleeves, an annular member attached to one end of the inner sleeve and provided with radial holes and axial cavities, said outer sleeve having apertures in one end thereof in the vicinity of the radial holes of the annular member, an outlet branch secured to a fixed part of the pump, said scroll groove propelling the coolant, entering the space between the two sleeves and over the exterior surfaces of the fixed and rotary seal rings and delivering it into the annular member and then to the outside of the outer sleeve and then to the outlet branch.

2. A mechanical seal as claimed in claim 1, in which the fixed outer sleeve has a part extending over the ends of the radial holes to protect the pump casing from erosion by the liquid delivered through such holes.

3. A mechanical seal as claimed in claim 2, wherein the annular member is provided with a cylindrical extension around the revolving inner sleeve and extends up to the scroll groove on such sleeve.

References Cited in the file of this patent

UNITED STATES PATENTS

| | | |
|---|---|---|
| 1,989,349 | Coberly | Jan. 29, 1935 |
| 2,128,496 | Murphy | Aug. 30, 1938 |
| 2,275,680 | Myers | Mar. 10, 1942 |
| 2,713,927 | Rabinow | July 26, 1955 |
| 2,824,759 | Tracy | Feb. 25, 1958 |